US008862790B2

(12) United States Patent
Lu et al.

(10) Patent No.: US 8,862,790 B2
(45) Date of Patent: Oct. 14, 2014

(54) METHOD FOR IDENTIFYING VERSION TYPE OF WINDOWS OPERATING SYSTEM ON A HOST BY A USB DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 92 days.

(21) Appl. No.: 13/640,997

(22) PCT Filed: Sep. 15, 2011

(86) PCT No.: PCT/CN2011/079679
§ 371 (c)(1),
(2), (4) Date: Oct. 12, 2012

(87) PCT Pub. No.: WO2012/034524
PCT Pub. Date: Mar. 22, 2012

(65) Prior Publication Data
US 2013/0031277 A1 Jan. 31, 2013

Related U.S. Application Data

(66) Substitute for application No. PCT/CN2011/079679, filed on Sep. 15, 2011.

(30) Foreign Application Priority Data

Sep. 16, 2010 (CN) .......................... 2010 1 0285447

(51) Int. Cl.
*G06F 3/00* (2006.01)
*G06F 9/44* (2006.01)
(52) U.S. Cl.
CPC .................................. *G06F 9/4411* (2013.01)
USPC .................................. 710/10; 710/15; 710/16
(58) Field of Classification Search
CPC .............................. G06F 13/385; G06F 9/4411
See application file for complete search history.

(56) References Cited

U.S. PATENT DOCUMENTS

2008/0005370 A1* 1/2008 Bolan et al. ...................... 710/8
2008/0289040 A1 11/2008 Ithal
(Continued)

FOREIGN PATENT DOCUMENTS

| CN | 1464387 | 12/2003 |
| CN | 101078985 | 11/2007 |
| CN | 101957807 | 1/2011 |

OTHER PUBLICATIONS

International Search Report dated Nov. 24, 2011 for PCT Application No. PCT/CN2011/079679 (5 pgs.).

*Primary Examiner* — Idriss N Alrobaye
*Assistant Examiner* — Ronald Modo
(74) *Attorney, Agent, or Firm* — Shumaker & Sieffert, P.A.

(57) ABSTRACT

The invention provides a method for identifying version type of a Windows operating system on a host by USB device, relating to operating system field and including steps: A, USB device is powered on and initialized; B, the USB device performs USB enumeration, determines whether a first predetermined instruction is received in process of USB enumeration, if yes, determines the operating system is a first operating system and goes to Step D, if no, goes to C; C, the USB device determines the device type returned in process of USB enumeration, if it is a CCID device, determines whether the received instruction includes a second predetermined instruction, if yes, determines the operating system is a second operating system, if no, determines the operating system is a third operating system; when the device is an SCSI device, the USB device determines whether the second received SCSI instruction is a third predetermined instruction or fourth predetermined instruction, if it is the third predetermined instruction, determines that the operating system is a second operating system, if it is the fourth predetermined instruction, determines that the operating system is a third operating system; D, the USB device establishes communication with the host, waits for instruction sent by the host and returns related information to the host according to the determined type of the host operating system.

19 Claims, 3 Drawing Sheets

(56) References Cited

U.S. PATENT DOCUMENTS

2009/0248907 A1* 10/2009 Huang et al. .................. 710/10
2012/0054372 A1* 3/2012 Chen et al. .................... 710/13
2012/0054384 A1* 3/2012 Zhang et al. ................... 710/62

* cited by examiner

METHOD FOR IDENTIFYING VERSION TYPE OF WINDOWS OPERATING SYSTEM ON A HOST BY A USB DEVICE

FIELD OF THE INVENTION

The invention relates to a computer operating system field and in particular, to a method for identifying version type of a Windows operating system on a host by a USB device.

BACKGROUND OF THE INVENTION

USB protocol technology is a serial bus standard by which a host is connected to a peripheral, which is widely used on a host (such as a personal computer, a personal digital assistant and a mobile computer, etc.). USB protocol technology supports hot-plug, instant plug-and-play and power supply via bus. Almost all peripherals such as mouse, keyboard, game handler, scanner, digital cameral, printer, hard disk, security device, disc driver and net card, can connect to and communicate with a host by operation of USB interface. So USB interface has become a default interface connecting most of the current host peripherals and a computer.

In some situation, a device should know type of operating system on a computer connecting to it. However, in the prior art the device cannot identify operating system on a host.

SUMMARY OF THE INVENTION

The invention provides a method for identifying version type of Windows operating system on a host by a USB device, including technical solutions as follows.

A method for identifying version type of Windows operating system on a host by a USB device, comprises steps that:

Step A, USB device is powered on and initialized.

Step B, the USB device performs USB enumeration and determines whether a first predetermined instruction is received in process of USB enumeration, if yes, the USB device determines that the host operating system is a first operating system and goes to Step D, if no, goes to Step C.

Step C, the USB device determines a device type returned to the host in process of USB enumeration.

if the device type returned to the host by the USB device is a CCID (USB Chip/Smart Card Interface Device) device, the USB device determines whether the received instruction includes a second predetermined instruction, if the received instruction includes the second predetermined instruction, the USB device determines that the host operating system is a second operating system; if the received instruction does not include the second predetermined instruction, the USB device determines that the host operating system is a third operating system.

if the device type returned to the host by the USB device is an SCSI (Small Computer Systems Interface) device, the USB device receives SCSI instruction sent by the host and determines whether the second received SCSI instruction is a third or fourth predetermined instruction, if the second received SCSI instruction is the third predetermined instruction, the USB device determines that the host operating system is the second operating system; if the second received SCSI instruction is the fourth predetermined instruction, the USB device determines that the host operating system is the third operating system.

Step D, the USB device establishes communication with the host, waits for receiving instruction sent by the host and returns corresponding information to the host according to the determined type of the host operating system.

The initializing comprises of initializing the device type id as a default device type id.

The initializing comprises of initializing the power-on id as a first predetermined value and initializing the device type id as a default device type id.

The USB device determining the device type returned to the host in process of USB enumeration is that the USB device determines the returned device type according to the device type id returned in process of USB enumeration.

The USB device determining the device type returned to the host in process of USB enumeration is that the USB device determines the returned device type according to the device type id returned in process of USB enumeration.

The method further comprises that after the USB device determines that type of the host operating system is the first operating system, the second operating system or the third operating system, it sets the device type id to be a first device type, a second device type id or a third device type id.

The Step D further comprises that the USB device determines whether the current device type id is identical to the default device type id, if yes, the USB device establishes communication with the host and waits for receiving instruction sent by the host, if no, the USB device performs soft power-off, sets the power-on id to be a second predetermined value and goes to Step A.

The initializing further comprises of initializing the power-on id as the first predetermined value and initializing type id of the operating system as the default type id of the operating system.

The method further comprises that the USB device stores a table mapping the operating system type id to the device type id.

The USB device determining the device type returned in process of USB enumeration comprises that the USB device retrieves the mapping table to obtain the corresponding device type id according to the default type id of the operating system and determines the returned device type according to retrieved device type id.

The method further comprises that after the USB device determines whether type of the host operating system is the first operating system, the second operating system or the third operating system, it sets type id of the operating system to be the first predetermined id, the second predetermined id or the third predetermined id.

Step D further comprises that the USB device determines whether the type id of the current operating system is identical to the type id of the default operating system, if yes, the USB device establishes communication with the host and waits for receiving instruction sent by the host, if no, the USB device performs soft power-off and sets the power-on id to be the second predetermined value and goes to Step A.

After Step A, the method further comprises of determining whether the USB device is powered on for the first time, if yes, going to Step B, if no, going to Step D.

The determining whether the USB device is powered on for the first time comprises of determining whether the power-on id is a first predetermined value, if yes, the USB device is powered on for the first time, if no, the USB device is not powered on for the first time.

The device type returned to the host by the USB device comprises HID device.

The first predetermined instruction is a device setting descriptor obtaining instruction, the second predetermined instruction is a device status obtaining instruction and the second SCSI instruction is a device information obtaining instruction.

The USB device determining whether the second received SCSI instruction is a third or a fourth predetermined instruction comprises that the USB device determines according to content in the instruction field of the second SCSI instruction, if content in the instruction field of the second SCSI instruction is a first predetermined content, the second instruction is the third predetermined instruction, if content in the instruction field of the second SCSI instruction is a second predetermined content, the second instruction is the fourth predetermined instruction.

The first operating system is Windows XP®, the second operating system is Windows 7® and the third operating system is Windows Vista®.

ADVANTAGES

A USB device identifies version type of Windows operating system on a host by analyzing a received instruction sent by the host and exposes a special USB feature corresponding to the host operating system so as to work with the host operating system perfectly.

DETAILED DESCRIPTION OF EMBODIMENTS

In order to make purpose, solution and advantages of the invention clearer, detailed descriptions will be given of the exemplary embodiments of invention in accompanying with the drawings.

Before the detailed explanation, a brief description is given of the communication principle between a USB device and a host.

The communication between a USB device and a host is that the host sends an instruction to the USB device and the USB device responses to the received instruction both with basic unit of package for communication which is classified as token package, data package and handshake package and type of package is defined by PID.

Format of the token package is SYNC+PID+ADDR+ENDP+CRC. Data package is divided into DATA0 package and DATA1 package, specifically when length of the data returned by the USB device is larger than length of the maximum output data package at a corresponding endpoint, data to be returned should be transferred in batch, and generally DATA0 package and DATA1 package are sent alternatively. Format of the handshake package is: SYNC+PID.

Data is sent and received via a device endpoint between USB device and a host.

For example:
PID:SETUP ADDR:00 ENDP:00 CRC5:02 idle:3
PID:DATA0 data:80 06 00 01 00 00 40 00 CRC16:94dd idle:7
PID:ACK idle:2ela The above instructions show that the package is SETUP package, content of data is 80 06 00 01 00 00 40 00, the handshake package is ACK. The SETUP package is sent by the host and the USB device returns a response message to the host upon receiving the SETUP package, for example:
PID:IN ADDR:00 ENDP:00 CRC5:02 idle:7
PID:DATA1 data:12 01 10 01 00 00 00 08 CRC16:7711 idle:7
PID:ACK idle:2e16
PID:OUT ADDR:00 ENDP:00 CRC5:02 idle:3
PID:DATA1 data: CRC16:0000 idle:7
PID:ACK idle:2e5a The response data returned by the USB device to the host is 12 01 10 01 00 00 00 08. It is noted that, the USB device returns response data to the host upon receiving IN or OUT token package sent by the host.

Thus, once of information communication is completed between the USB device and host, and each of it is started by receiving SETUP PACKAGE sent by the host.

Additionally, it should be noted that USB device can be divided into CCID device, SCSI device and HID device according to different communication protocol, such as CCID, SCSI or HID, used by data communication between a USB device and host.

Embodiment 1

Figure 1:
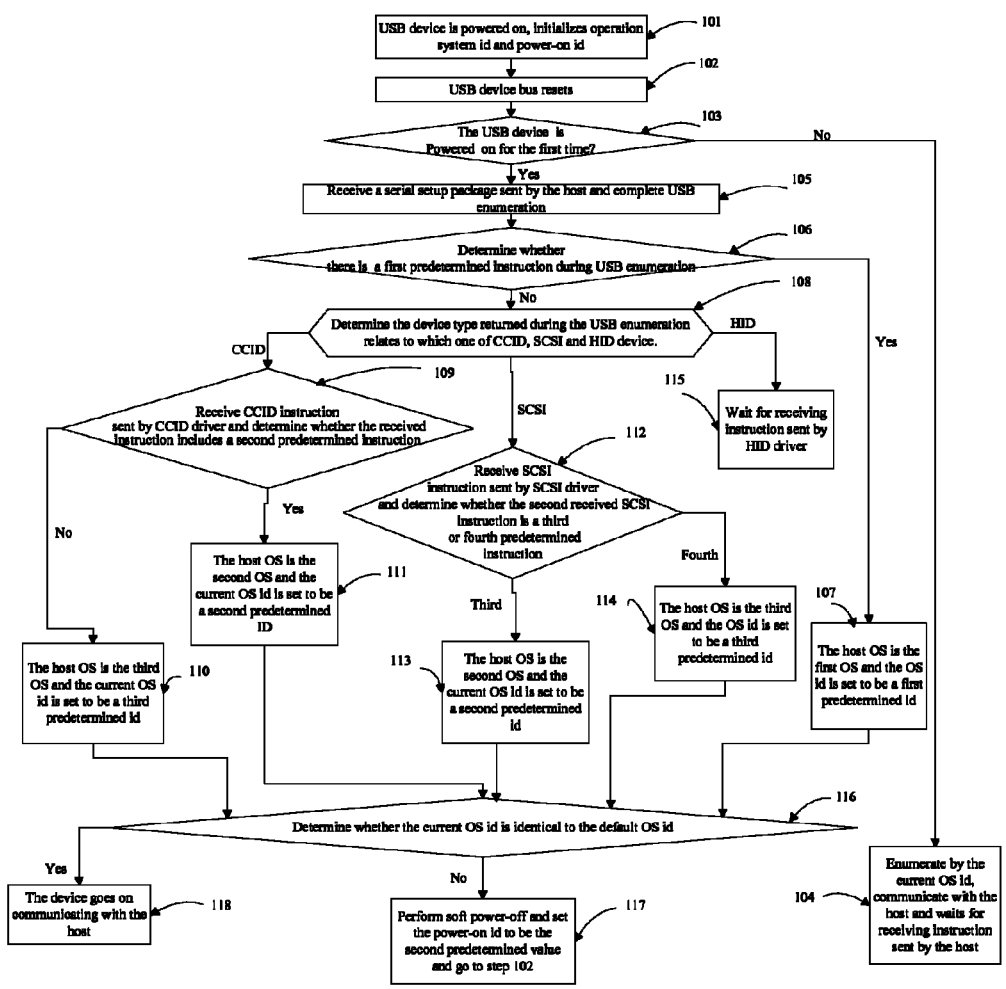
FIG. 1 is a flow chart of method for identifying version type of Windows operating system on a host by a USB device, provided by embodiment 1 of the invention

The embodiment provides a method for identifying version type of Windows operating systems on a host by a USB device. The version type of Windows operating system is divided by difference in kernel, which is set forth by example of Windows XP®, Windows Vista® and Windows 7® as follows. As shown in FIG. 1, the method includes that:

101, the USB device is powered on and initialized;

The USB device includes a security device such as USB Key and card reader etc.

In details, the USB device is connected to a host via USB bus and obtains working voltage from Vcc (power supply voltage or working voltage) pin of the host;

The initializing includes that the USB device initializes power-on id and operating system id stored in it, as default id.

Specifically, the default power-on id is a first predetermined value, and the default operating system id can be one of a first predetermined id, a second predetermined id and a third predetermined id.

The first predetermined id corresponds to a first operating system, the second predetermined id corresponds to a second operating system and the third predetermined id corresponds to a third operating system.

It needs to explain that the host operating system monitors whether a device is connected to the USB bus all the time, in details by checking change in Vcc pull-up resistor, and in case of checking a connection of a USB device, loading the device bus driver and beginning to enumerate the device as shown in Steps 102-106.

102, the USB device bus resets.

It is noted that, after the USB bus resets, default address 0 of the USB device is enabled, and then the address 0 is used for transferring data and instruction between the USB device and host.

103, the USB device determines whether it is powered on for the first time, if no, goes to Step 104, if yes, goes to Step 105.

The determining whether the USB device is powered on for the first time is determining whether the power-on id is the first predetermined value, if yes, the USB device is powered on for the first time, if no, the USB device is not powered on for the first time.

104, the USB device completes the enumeration according to a current operating system id, communicates with the host and waits for instructions sent by the host.

105, the USB device receives a serial of setup packages sent by the host and completes USB enumeration according to the default operating system id.

Specifically, the host operating system corresponding to the default operating system id sends a serial of setup packages to the USB device and enumerates the USB device for obtaining descriptor information of the USB device.

The USB device receives a serial of setup packages sent by the host, including instructions such as device descriptor obtaining, device address setting, setting descriptor obtaining, endpoint descriptor obtaining, character string descriptor obtaining, setting selecting etc., and responses to the instructions one by one.

106, the USB device determines whether there is a first predetermined instruction in process of USB enumeration, if yes, goes to Step 107, if no, goes to Step 108.

Specifically, the first predetermined instruction is a setting description, and obtaining configuration descriptor is 80 06 00 02 00 00 09 00.

107, the USB device determines that the host operating system is the first operating system, sets the operating system id to be the first predetermined id and goes to Step 116.

Specifically, the first operating system is Windows XP®.

108, the USB device determines that the device type returned in process of the USB enumeration is a CCID device, an SCSI device or an HID device according to the default operating system id, if the device type is a CCID device, goes to Step 109, if the device type is an SCSI device, goes to Step 112, if the device type is an HID device, goes to Step 115.

Specifically, in process of USB enumeration, upon receiving "obtaining device descriptor" information sent by the host, the USB device retrieves the device type corresponding to the operating system id in the table mapping the operating system id to the device type id, and sends the retrieved device type to the host.

Wherein the table mapping the operating system id to the device type id is predetermined and stored in the USB device.

Therefore, when determining the returned device type, the USB device confirms the device type according to the operating system id by retrieving the table mapping the operating system id to the device type id.

For example, the first predetermined id maps to a CCID device id, the second predetermined id maps to an SCSI device id and the third predetermined id maps to an HID device id, and thus when the operating system id is the first predetermined id, the USB device knows that the returned device type is a CCID device according to the id 109, the USB device receives the CCID instruction sent by CCID driver on the host and determines whether the received instruction includes the second predetermined instruction, if no, goes to Step 110, if yes, goes to Step 111.

Before that, upon receiving the information returned by the USB device that it is a CCID device, the host loads the corresponding CCID driver, and the USB device establishes communication with the host and waits for receiving instruction sent by the CCID driver.

Specifically, the second predetermined instruction is an obtaining device status instruction, for example 80 00 00 00 00 00 02 00.

110, the USB device determines that the host operating system is the third operating system, sets the current operating system id to be the third predetermined id and goes to Step 116.

Specifically, the third operating system is Windows Vista®.

111, the USB device determines that the host operating system is the second operating system, sets the current operating system id to be the second predetermined id, and goes to Step 116.

Specifically, the second operating system is Windows 7®.

112, the USB device receives SCSI instruction sent by the SCSI driver and determines whether the second received SCSI instruction is the first predetermined instruction or the fourth predetermined instruction, if the second received SCSI instruction is the third predetermined instruction, goes to Step 113, if the second received SCSI instruction is the fourth predetermined instruction, goes to Step 114.

Before that, after receiving the information returned by the USB device that it is an SCSI device, the host loads the corresponding SCSI driver and the USB device establishes communication with the host and waits for receiving the instruction sent by the SCSI driver.

Specifically, the second SCSI instruction is an obtaining device information instruction, for example an Inquiry instruction, for inquiring the device information.

Specifically, when value in the CBWCB field of the Inquiry instruction is a first predetermined content, the second SCSI instruction is the third predetermined instruction while the second SCSI instruction is the fourth predetermined instruction when value in the CBWCB field of the Inquiry instruction is a second predetermined content.

The CBWCB field is an instruction executed by the device, and explained by the device.

Wherein the first predetermined content is 12 00 00 00 24 00, the second predetermined content is 12 01 80 00 ff 00.

Specifically, the third predetermined instruction is 55 53 42 43 b0 f8 82 91 ff 00 00 00 80 00 06 12 00 00 00 24 00 00 00 00 00 00 00 00 00 00 00.

Specifically, the fourth predetermined instruction is 55 53 42 43 b0 f8 82 91 ff 00 00 00 80 00 06 12 01 80 00 ff 00 00 00 00 00 00 00 00 00 00 00.

113, the USB device determines that the host operating system is the second operating system, sets the current operating system id to be the second predetermined id, and goes to Step 116.

Specifically, the second operating system is Windows 7®.

114, the USB device determines that the host operating system is the third operating system, sets the current operating system to be the third predetermined id, and goes to Step 116.

Specifically, the third operating system is Windows Vista®.

115, the USB device waits for receiving instruction sent by the HID driver.

116, the USB device determines whether the current operating system id is identical to the default operating system id, if no, goes to Step 117; if yes, goes to Step 118.

117, the USB device performs soft power-off, sets the power-on id to be the second predetermined value, and returns to Step 102.

Before explaining the soft power-off, it is appreciated that the USB device informs the computer of its hot swapping status by changing Vcc (power supply voltage or working voltage) pull-up resistor status. Inside the USB device a pull-up resistor is integrated, which is not connected to Vcc pin at default status and which is connected to Vcc pin in case that a connection is established between the USB device and the host such that the host can check whether there is a connection by a USB device by checking change in pull-up resistor on Vcc.

The soft power-off is that the USB device disconnects the connection between its inside pull-up resistor and Vcc pin such that the host operating system monitors the plug status of the USB device, however in fact USB device is still connected to Vcc and can obtain power supply from Vcc and thus is in power-on status, and after the disconnection for a predetermined time period, quiet a short time period, the pull-up resistor inside the USB device is connected to VCC again and so the host operating system monitors the insertion of the USB device and enumerates again, this means that the USB device returns to execute Step 102.

Herein, purpose for the soft power-off is: as known from the above processes, before the determination of the operating system type, the USB device has completed USB enumeration and returned device information, such as device type etc., according to the default operating system id, which results in an error, for example, if the default operating system is the second operating system, such as Windows 7®, the device type returned after the enumeration is SCSI device, while if the operating system type is determined as a Windows XP® system, the real device type returned to the host should be CCID device which is different from the error result derived from the default operating system id, and therefore a soft power-off is needed, and follows an enumeration according to the modified operating system id, returns a correct device information and identifies the correct operating system type for the host.

118, the USB device goes on communicating with the host.

Embodiment 2

The embodiment provides a method for identifying version type of Windows operating system on a host by a USB device. Type of Windows operating system is divided by difference in kernel, which is set forth by example of Windows XP®, Windows Vista® and Windows 7®.

Figure 2:
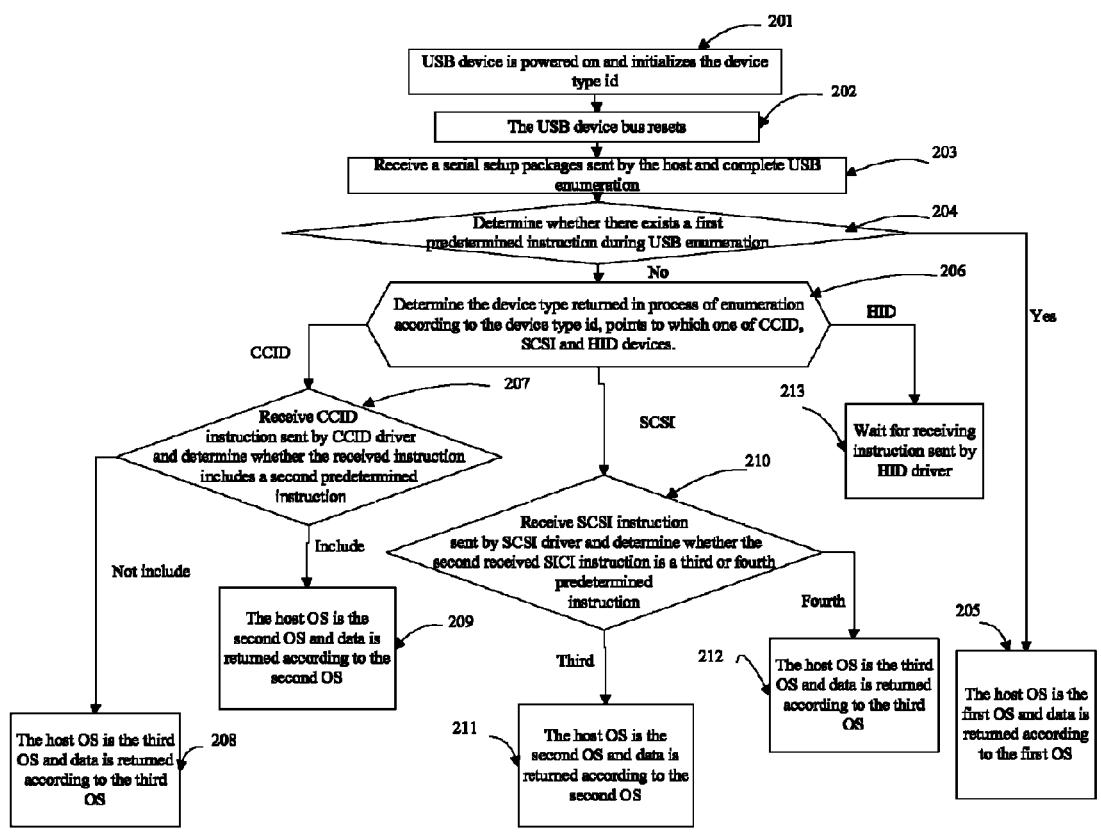
FIG. 2 is a flow chart of method for identifying version type of Windows operating system on a host by a USB device, provided by embodiment 2 of the invention.

As shown in FIG. 2, the method is as follows:

201, a USB device is powered on and initialized.

Specifically, a USB device is connected to a host by USB bus, and obtains working voltage from Vcc (power supply voltage or working voltage) of the host.

The initialization includes that the USB device initializes the device type id as a default id.

It is noted that the host operating system monitors whether a device is connected to it via USB bus by checking change in pull-up resistor of the Vcc pin, if the host monitors a connection by a USB device, it loads the device bus driver and enumerates the USB device.

202, the USB device bus resets.

Note: after the USB device bus resets, the default address 0 of the USB device is enabled and with which the USB device transfers instruction and data with the host.

203, the USB device receives a serial of setup packages sent by the host and completes USB enumeration according to the default device type.

The USB device receives a serial of setup packages, including device descriptor obtaining, device address setting, setting descriptor obtaining, endpoint descriptor obtaining, interface descriptor obtaining, setting selecting and etc, sent by the host and responses to them, by which the USB enumeration is completed.

It is noted that, in process of enumeration, upon receiving the device descriptor obtaining instruction sent by the host, the USB device returns the default device type id to the host so as to inform the host of its device type.

204, the USB device determines whether there is a first predetermined instruction in the process of USB enumeration, if yes, goes to Step 205, if no, goes to Step 206.

Specifically, the first predetermined instruction is "obtaining configuration descriptor" instruction.

Specifically, "obtaining configuration descriptor" instruction is 80 06 00 02 00 00 09 00.

205, the USB device determines that the host operating system is a first operating system, communicates with the host, waits for receiving instruction from the first operating system on the host and returns the corresponding data.

Specifically, the first operating system on the host loads the corresponding driver according to the default device type, establishes communication with the USB device and waits for receiving instruction sent by the first operating system on the host.

Herein, the first operating system is Windows XP®.

206, the USB device determines which one of CCID device, SCSI device and HID device is represented by the default device type id.

If the default device type id represents a CCID device, go to Step 207; if the default device type id represents an SCSI device, go to Step 210; if the default device type id represents an HID device, go to Step 213.

The device type id identifies a predetermined device type, by which the USB device determines the device type. For example, the device type id 0 points to a CCID device; device type id 1 points to an SCSI device and device type id 2 points to an HID device.

207, the USB device receives CCID instruction sent by the CCID driver on the host and determines whether the received instruction includes a second predetermined instruction, if no, goes to Step 208, if yes, goes to Step 209.

Before Step 207, after receiving information returned by the USB device that it is a CCID device, the host loads the corresponding CCID driver, and the USB device establishes communication with the host and waits for receiving instruction sent by the CCID driver.

Specifically, the second predetermined instruction is an obtaining device status instruction.

Specifically, the obtaining device status instruction is 80 00 00 00 00 00 02 00.

Step 208, the USB device determines that the host operating system is a third operating system, waits for receiving instruction sent by the third operating system on the host and returns corresponding data.

Specifically, the third operating system is Windows Vista®.

209, the USB device determines that the host operating system is a second operating system, waits for receiving instruction sent by the second operating system on the host and returns corresponding data.

Specifically, the second operating system is Windows 7®.

210, the USB device receives SCSI instruction sent by the SCSI driver and determines whether the second received SCSI instruction is a third predetermined instruction or a fourth predetermined instruction, if it is the third predetermined instruction, goes to Step 211, if it is the fourth predetermined instruction, goes to Step 212.

Before Step 210, after receiving information returned by the USB device that it is an SCSI device, the host loads corresponding SCSI driver, and the USB device establishes communication with the host and waits for receiving instruction sent by the SCSI driver.

Specifically, the second SCSI instruction is an obtaining device information instruction (Inquiry instruction) for inquiring information of the device.

Specifically, when a value in CBWCB field of Inquiry instruction is a first predetermined content, the second SCSI instruction is a third predetermined instruction, while when the value in CBWCB field of Inquiry instruction is a second predetermined content, the second SCSI instruction is a fourth predetermined instruction.

The CBWCB field is an instruction executed and explained by the device.

Hereby, the first predetermined content is 12 00 00 00 24 00, the second predetermined content is 12 01 80 00 ff 00.

Specifically, the third predetermined content is 55 53 42 43 b0 f8 82 91 ff 00 00 00 80 00 06 12 00 00 00 24 00 00 00 00 00 00 00 00 00 00 00.

Specifically, the fourth predetermined content is 55 53 42 43 b0 f8 82 91 ff 00 00 00 80 00 06 12 01 80 00 ff 00 00 00 00 00 00 00 00 00 00 00.

211, the USB device determines that the host operating system is the second operating system, waits for receiving instruction sent by second operating system on the host and returns corresponding data.

Specifically, the second operating system is Windows 7®.

212, The USB device determines that the host operating system is a third operating system, waits for receiving instruction sent by the third operating system on the host and returns corresponding data.

Specifically, the third operating system is Windows Vista®.

213, the USB device waits for receiving instruction sent by HID driver.

It is noted that, when receiving an instruction of reading what is on a disc sent by operating system on the host, the USB device returns data according to the determined operating system type, to the host. For example, after the SCSI device determines the first operating system, the second operating system or the third operating system, it receives a standard SCSI instruction of reading what is on the disc sent by the host, i.e. 55 53 42 43 b0 94 f0 85 00 08 00 00 080 000a 28 00 00 00 00 11 00 00 01 00 00 00 00 00 00 00, and further in case of determining a first operating system on the host, the SCSI device returns data 02 43 44 30 30 31 01 00 00 57 00 69 00 6e 00 33 00 32 00 20 00 20 00 20 00 20 00 20 00 20 00 20, in case of determining a second operating system on the host, the SCSI device returns data 00 43 44 30 30 31 01 00 00 57 00 69 00 6e 00 33 00 32 00 20 00 20 00 20 00 20 00 20 00 20 00 20, in case of determining a third operating system on the host, the SCSI device returns data 05 43 44 30 30 31 01 00 00 57 00 69 00 6e 00 33 00 32 00 20 00 20 00 20 00 20 00 20 00 20 00 20.

Embodiment 3

Figure 3:
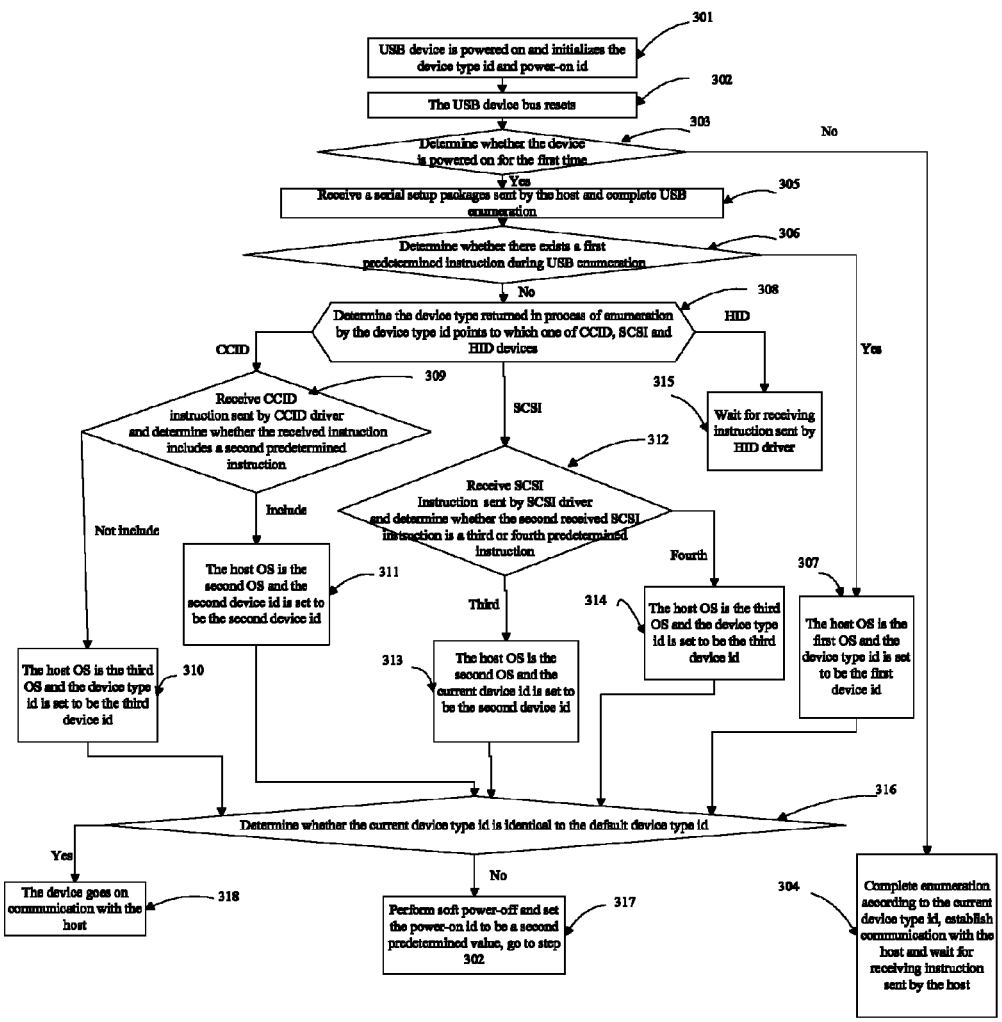
FIG. 3 is a flow chart of method for identifying version type of Windows operating system on a host by a USB device, provided by embodiment 3 of the invention.

The embodiment provides a method for identifying version type of Windows operating system on a host by a USB device. Type of Windows operating system is divided by difference in kernel, which is set forth by example of Windows XP®, Windows Vista® and Windows 7® as follows. As shown in FIG. 3, the method includes steps as follows.

Before detailed description, it should be appreciated that inside the USB device stores a table mapping operating system id to device type id, which is predetermined. In the embodiment, a first predetermined id maps to a first device id, a second predetermined id maps to a second device id and a third predetermined id maps to a third device id. In details, the first predetermined id corresponds to a first operating system, the second predetermined id corresponds to a second operating system and the third predetermined id corresponds to a third operating system. The first device id corresponds to a CCID device, the second device id corresponds to an SCSI device and the third device id corresponds to an HID device.

301, a USB device is powered on and initialized.

Specifically, the USB device is connected to a host via USB bus, and obtains working voltage from Vcc (power supply voltage or working voltage) pin of the host.

The initialization includes that the USB device initializes the power-on id, device type id as default ids.

In details, the default power-on id is a predetermined value and the default device type id can be one of a first device id, a second device type id and a third device id.

It is noted that, the operating system on the host keeps monitoring whether a device is connected to it via USB bus by checking change in pull-on resistor of the Vcc pin, and upon checking a connection by a USB device, the host loads the device bus driver and enumerates the USB device.

302, the USB device bus resets.

It is noted that, after the USB device bus resets, the default address 0 of the USB device is enabled and with which the USB device transfers instruction and data with the host.

303, the USB device determines itself that whether it is powered on for the first time, if no, goes to Step 304, if yes, goes to Step 305.

The determining whether the USB device is powered on for the first time is determining whether the power-on id is a first predetermined value, if yes, the USB device is powered on for the first time, if no, the USB device is not powered on for the first time.

304, the USB device completes enumeration according to the current device type id, establishes communication with the host and waits for receiving instruction sent by the host.

305, the USB device receives a serial of setup packages sent by the host and completes the USB enumeration.

The USB device receives the serial setup packages sent by the host includes instructions such as device descriptor obtaining, device address setting, setting descriptor obtaining, endpoint descriptor obtaining, character string descriptor obtaining, endpoint descriptor obtaining and setting selecting and etc, and responses to them one by one.

306, the USB device determines whether there is a first predetermined instruction in process of USB enumeration, if yes, goes to Step 307, if no, goes to Step 308.

Specifically, the first predetermined instruction is a setting descriptor obtaining instruction, for example 80 06 00 02 00 00 09 00.

307, the USB device determines that the host operating system is the first operating system, sets the device type id to be the first device id and goes to Step 316.

Specifically, the first operating system is Windows XP®.

308, the USB device determines that of the USB device is CCID device, SCSI device or HID device according to device type id.

If the USB device is a CCID device, go to Step 309; if the USB device is a SCSI device, go to Step 312; and if the USB device is an HID device, go to Step 315.

309, the USB device receives CCID instruction sent by CCID driver on the host and determines whether the received instruction includes a second predetermined instruction, if no, goes to Step 310, if yes, goes to Step 311.

Before the step, upon receiving information returned by the USB device that it is a CCID device, the host loads the corresponding CCID driver, and the USB device establishes communication with the host and waits for receiving instruction sent by the CCID driver.

Specifically, the second predetermined instruction is a device status obtaining instruction, for example 80 00 00 00 00 00 02 00.

310, the USB device determines that the operating system on the host is the third operating system and sets the current device type id to be the third device id, goes to Step 316.

Specifically, the third operating system is Windows Vista®.

311, the USB device determines that the operating system on the host is a second operating system and sets the current device type id to be the second device id, goes to Step 316.

Specifically, the second operating system is Windows 7®.

312, the USB device receives SCSI instruction sent by an SCSI driver and determines whether the second received SCSI instruction is a third predetermined instruction or fourth predetermined instruction, if the second received SCSI instruction is the third predetermined instruction, go to Step 313, if the second received SCSI instruction is the fourth predetermined instruction, go to Step 314.

Before the step, after receiving the information by the USB device that it is an SCSI device, the host loads the corresponding SCSI driver, and the USB device establishes communication with the host and waits for receiving instruction sent by the SCSI driver.

Specifically, the second SCSI instruction is a device information obtaining instruction (Inquiry instruction) for inquiring information of the device.

Specifically, when a value in CBWCB field of Inquiry instruction is a first predetermined content, the second SCSI instruction is the third predetermined instruction, while when the value in CBWCB field of Inquiry instruction is a second predetermined content, the second SCSI instruction is the fourth predetermined instruction.

Content in the CBWCB field shows an instruction executed by the device and explained by the device.

The first predetermined content is 12 00 00 00 24 00, the second predetermined content is 12 01 80 00 ff 00.

Specifically, the third predetermined instruction is 55 53 42 43 b0 f8 82 91 ff 00 00 00 80 00 06 12 00 00 00 24 00 00 00 00 00 00 00 00 00 00 00 and the fourth predetermined instruction is 55 53 42 43 b0 f8 82 91 ff 00 00 00 80 00 06 12 01 80 00 ff 00 00 00 00 00 00 00 00 00 00 00.

313, the USB device determines that the operating system on the host is the second operating system and sets the current device type id to be the second device id, goes to Step 316.

Specifically, the second operating system is Windows 7®.

314, the USB device determines that the operating system on the host is the third operating system and sets the current device type id to be the third device id, goes to Step 316.

Specifically, the third operating system is Windows Vista®.

315, the USB device waits for receiving instruction sent by the HID driver.

316, the USB device determines whether the current device type id is identical to the default device type id, if no, goes to Step 317, if yes, goes to Step 318.

317, the USB device performs soft power-off, sets the power-on id to be a second predetermined value and returns to Step 302.

Herein, description and method for dealing with soft power-off has been set forth in Step 116, and therefore it is omitted herein.

Herein, purpose for the soft power-off is: as known from the above processes, before the determination of the operating system type, the USB device has completed USB enumeration and returned device information, such as device type etc., according to the default operating system id, which results in an error, for example, if the default device type is returned to the host in the enumeration, the device type is SCSI device. However, if the operating system type is determined as a Windows XP® system, the real device type returned to the host should be a CCID device which is different from the error result derived from the default operating system id, and therefore the USB device needs to perform a soft power-off, and follows an enumeration according to the modified operating system id, returns a correct device information and identifies the correct operating system type for the host.

318, the USB device goes on communication with the host.

In the above embodiment, the USB device analyzes the instruction sent by the host so as to determine version type of Windows operating system on the host, without additional device and soft, easy, convenient and fast, and after determining version type of Windows operating system on the host, the USB device exposes different USB features to related host operating system, and switches type of operating system or device by setting operating system id or device type id so as to work better with operating system on the host.

The above-mentioned are just preferred embodiments of the invention, not limited to the invention. All modifications, alternations and improvements within the spirit and principle of the invention should fall within the scope of protection of the invention.

What is claimed is:

1. A method for identifying version type of Windows operating system on a host by USB device, comprising:
   Step A, powering on and initializing a USB device;
   Step B, the USB device performing USB enumeration and determining whether a first predetermined instruction is received in process of USB enumeration, if yes, the USB device determining that the host operating system is a first operating system and executing Step D, if no, executing Step C;
   Step C, the USB device determining a device type returned to the host in process of USB enumeration;
   if the device type returned to the host by the USB device is a CCID device, the USB device determining whether the received instruction includes a second predetermined instruction, if the received instruction includes the second predetermined instruction, the USB device determining that the host operating system is a second operating system; if the received instruction does not include the second predetermined instruction, the USB device determining that the host operating system is a third operating system;
   if the device type returned to the host by the USB device is an SCSI device, the USB device receiving SCSI instructions sent by the host and determining whether the second received SCSI instruction is a third or fourth predetermined instruction, if the second received SCSI instruction is the third predetermined instruction, the USB device determining that the host operating system is the second operating system; if the second received SCSI instruction is the fourth predetermined instruction, the USB device determining that the host operating system is the third operating system; and
   Step D, the USB device establishing communication with the host, waiting for receiving instruction sent by the host and returning corresponding information to the host according to the determined type of the host operating system.

2. The method according to claim 1, wherein the initializing comprises initializing the device type id as a default device type id.

3. The method according to claim 2, wherein the USB device determining the device type returned to the host in process of USB enumeration is that the USB device determines the returned device type according to the device type id returned in process of USB enumeration.

4. The method according to claim 1, wherein the initializing comprises of initializing the power-on id as a first predetermined value and initializing the device type id as a default device type id.

5. The method according to claim 4, wherein the USB device determining the device type returned to the host in process of USB enumeration is that the USB device determines the returned device type according to the device type id returned in process of USB enumeration.

6. The method according to claim 4, wherein the method further comprises that after determining the type of the host operating system is the first operating system, the second operating system or the third operating system, the USB device sets the device type id to be a first device type id, a second device type id or a third device type id.

7. The method according to claim 6, wherein the Step D further comprises that the USB device determines whether the current device type id is identical to the default device type id, if yes, the USB device establishing communication with the host and waiting for receiving instruction sent by the host, if no, the USB device performing soft power-off, setting the power-on id to be a second predetermined value and executing Step A.

8. The method according to claim 7, wherein after Step A, the method further comprises: determining whether the USB device is powered on for the first time, if yes, executing Step B, if no, executing Step D.

9. The method according to claim 8, wherein the determining whether the USB device is powered on for the first time comprises of determining whether the power-on id is the first predetermined value, if yes, the USB device is powered on for the first time, if no, the USB device is not powered on for the first time.

10. The method according to claim 1, wherein the initializing further comprises of initializing the power-on id as a first predetermined value and initializing the type id of the operating system as a default type id of the operating system.

11. The method according to claim 10, wherein the method further comprises that the USB device stores a table mapping the operating system type id to the device type id.

12. The method according to claim 11, wherein the USB device determining the device type returned in process of USB enumeration comprises that the USB device retrieves the mapping table to obtain the corresponding device type id according to the default type id of the operating system and determines the returned device type according to retrieved device type id.

13. The method according to claim 10, wherein the method further comprising: after determining whether the type of the host operating system is the first operating system, the second operating system or the third operating system, the USB device sets the type id of the operating system to be the first predetermined id, the second predetermined id or the third predetermined id.

14. The method according to claim 13, wherein Step D further comprises that the USB device determines whether the type id of the current operating system is identical to the type id of the default operating system, if yes, the USB device establishes communication with the host and waits for receiving instruction sent by the host, if no, the USB device performs software power-off and sets the power-on id to be the second predetermined value and goes to Step A.

15. The method according to claim 14, wherein after Step A, the method further comprises: determining whether the USB device is powered on for the first time, if yes, executing Step B, if no, executing Step D.

16. The method according to claim 1, wherein the device type returned to the host by the USB device further comprises HID device.

17. The method according to claim 1, wherein the first predetermined instruction is a device setting descriptor obtaining instruction, the second predetermined instruction is a device status obtaining instruction and the second SCSI instruction is a device information obtaining instruction.

18. The method according to claim 1, wherein the USB device determining whether the second received SCSI instruction is the third or the fourth predetermined instruction is: the USB device determining according to content in the instruction field of the second SCSI instruction, if the content in the instruction field of the second SCSI instruction is a first predetermined content, the second instruction is the third predetermined instruction, if the content in the instruction field of the second SCSI instruction is a second predetermined content, the second instruction is the fourth predetermined instruction.

19. The method according to claim 1, wherein the first operating system is Windows XP®, the second operating system is Windows 7® and the third operating system is Windows Vista®.

* * * * *